No. 781,159. PATENTED JAN. 31, 1905.
F. W. REED.
VALVE SEATING FOR SPRINKLERS.
APPLICATION FILED JAN. 7, 1904.

Witnesses.
James E. Babcock

Inventor
Frank W. Reed
by Wm H Babcock
Attorney

No. 781,159.

Patented January 31, 1905.

UNITED STATES PATENT OFFICE.

FRANK WILLIAM REED, OF STOCKPORT, ENGLAND.

VALVE-SEATING FOR SPRINKLERS.

SPECIFICATION forming part of Letters Patent No. 781,159, dated January 31, 1905.

Application filed January 7, 1904. Serial No. 188,103.

*To all whom it may concern:*

Be it known that I, FRANK WILLIAM REED, a subject of the King of Great Britain and Ireland, and a resident of The Grange, South Reddish, Stockport, in the county of Chester, England, have invented a certain new and useful Valve-Seating for Sprinklers, (for which I have filed application for British Patent No. 16,250, dated July 23, A. D. 1903;) and I do hereby declare the following to be a full, clear, and exact description of the invention, such as will enable others skilled in the art to which it appertains to make and use the same.

My said invention relates to improvements in or applicable to the sprinklers or water-discharging devices of automatic fire-extinguishing apparatus.

Figure 1:
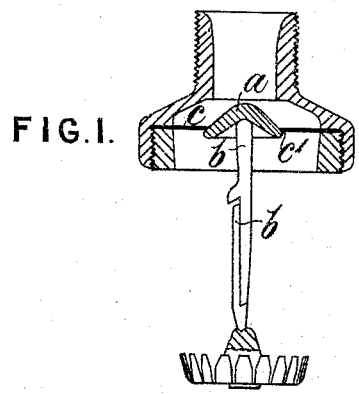
Figure 1:
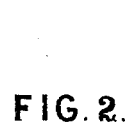
Figure 2:
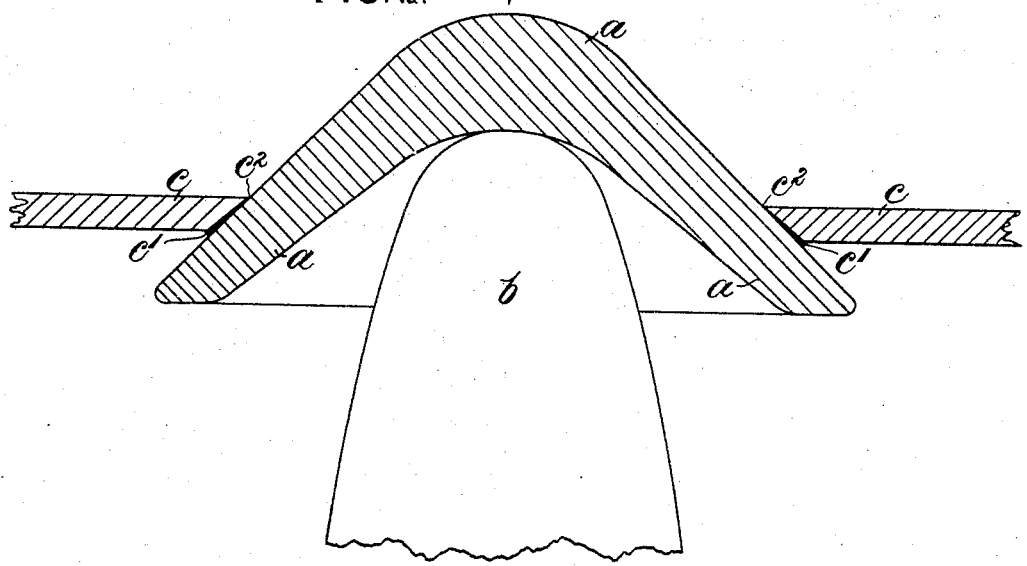

In the accompanying drawings, Figure 1 is a sectional elevation of a complete sprinkler. Fig. 2 is a sectional elevation, to an enlarged scale, of the part to which my said invention relates. In this figure the description of the water-pressure is indicated by an arrow.

In such apparatus a valve $a$ is held on or in its seating $c'$ by a strut or other support $b$, exerting pressure so as to prevent it being opened by the pressure of water above or behind the valve until such time as in consequence of increased temperature operating to remove the support the valve is freed to allow the escape of water.

The valve-seating is formed in a diaphragm-plate $c$. In some constructions at present in use the diaphragm-plate of hard metal is perforated with a cylindrical hole, to the face of which is applied a ring of softer metal, in or against which the conical or conoidal valve rests. The object of using soft metal is that it may by yielding accommodate itself to any irregularities in the contour or surface of the valve, and thus prevent the escape of water.

Having no external support, such a ring can yield or flow laterally under the pressure of the valve.

According to my said invention I perforate the diaphragm-plate $c$ with a conical or conoidal hole and line the same with softer metal and then bore or ream such lining with a conical or conoidal hole of a more acute taper than the hole in the diaphragm-plate, as shown in section in Fig. 2. The hole in the diaphragm-plate is thus lined with a wedge-like annulus $c'$ of soft metal, thickest at the side where the valve is inserted and tapering to the side next the water. When the valve is pressed into the seating, the soft metal accommodates itself to the surface of the valve and forms a packing which is compressed by the wedge-like action of the valve, while lateral flow of the soft metal is prevented by the surrounding hard-metal diaphragm-plate. Owing to the conical or conoidal shape of the aperture in the diaphragm-plate, the edge of the aperture at $c^2$ on the water side is tapered or thinned off and so as to become spring-like and capable of yielding under the pressure of the valve, so that by its resiliency it can grip the valve, and thus aid in insuring a more perfect joint. The surfaces of the hole in the seating and the valve may be conical or conoidal—*i. e.*, such surfaces as are generated by the revolution of a triangle, an ellipse, a parabola, a circle or other curve about its axis.

I am aware that a packing has heretofore in devices of similar general nature been arranged to surround the valve outside of the tapered seat-opening in the plate. So arranged, it will be liable to spread laterally away from the valve under pressure instead of packing between valve and seat, as it must do when arranged in the said tapered hole, as I have shown and described.

What I claim as my invention, and desire to secure by Letters Patent, is—

1. In a sprinkler the combination of a diaphragm-plate $c$ of hard metal having a conical or conoidal annulus $c'$ of softer metal wedge-like in cross-section for the reception of the valve and a conical or conoidal valve $a$ the said annulus being inside the tapered valve-seat hole of said diaphragm-plate and therefore arranged and adapted to pack between the said valve and seat without lateral flow substantially as set forth and shown.

2. In a sprinkler, a valve of conical form, in combination with a diaphragm-plate conically bored to provide a seating of greater diameter and more obtuse angle and an interposed annular wedge of relatively soft and more easily fusible material, the outer face of said wedge being adapted to fit the said seating and its inner face being of more acute angle than its outer face to approximately fit said valve in order that said annular wedge may be tightly packed between the said parts by forcing the valve into its place in the seating substantially as set forth.

In witness whereof I have hereunto set my hand in the presence of two witnesses.

FRANK WILLIAM REED.

Witnesses:
 JOHN HALL,
 G. W. TUNSTALL.